US011097968B2

(12) United States Patent
Charlesworth et al.

(10) Patent No.: US 11,097,968 B2
(45) Date of Patent: *Aug. 24, 2021

(54) COMPOSITIONS AND METHODS FOR SCALE INHIBITION

(71) Applicant: Chevron U.S.A. Inc., San Ramon, CA (US)

(72) Inventors: Mark Charlesworth, Woodvale (AU); Christopher John Kalli, Herne Hill (AU); David Glynn Thomas, Wembley Downs (AU); Wei Shi, Houston, TX (US); Brendan Francis Graham, Parkwood (AU); Zachary Mark Aman, South Perth (AU); Eric Freemantle May, Mount Pleasant (AU)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,394

(22) Filed: Sep. 13, 2019

(65) Prior Publication Data

US 2020/0002206 A1 Jan. 2, 2020

Related U.S. Application Data

(63) Continuation of application No. 15/010,550, filed on Jan. 29, 2016, now Pat. No. 10,427,963.

(Continued)

(51) Int. Cl.
*C02F 5/02* (2006.01)
*C02F 1/66* (2006.01)
(Continued)

(52) U.S. Cl.
CPC .............. *C02F 5/02* (2013.01); *C02F 1/66* (2013.01); *C02F 1/68* (2013.01); *C02F 5/10* (2013.01);
(Continued)

(58) Field of Classification Search
CPC ...................................................... C02F 5/02
See application file for complete search history.

(56) References Cited

U.S. PATENT DOCUMENTS 5,596,084 A 1/1997 Sanderson et al.
6,641,740 B2 11/2003 Cornelius et al.
(Continued)

FOREIGN PATENT DOCUMENTS

EP 0784651 7/1997
EP 2010457 1/2009
(Continued)

OTHER PUBLICATIONS

International Search Report, dated Apr. 6, 2016, during the prosecution of International Application No. PCT/US2016/015657.

(Continued)

*Primary Examiner* — Peter Keyworth
(74) *Attorney, Agent, or Firm* — Meunier Carlin & Curfman LLC

(57) ABSTRACT

A method for inhibiting the formation, deposition and adherence of scale to metallic and other surfaces in the equipment, vessels and/or piping of facilities for the handling of oil and gas produced fluid is disclosed. An effective scale inhibiting amount of alginate is added to a produced fluid containing a scale-forming divalent cation. The alginate effectively cross-links with a scale-forming divalent cation, e.g., calcium, forming an alginate gel for subsequent separation and removal from the produced fluid.

23 Claims, 4 Drawing Sheets

Related U.S. Application Data

(60) Provisional application No. 62/111,312, filed on Feb. 3, 2015.

(51) Int. Cl.

| | | |
|---|---|---|
| *C02F 1/68* | (2006.01) | |
| *C02F 5/10* | (2006.01) | |
| C02F 101/10 | (2006.01) | |
| C02F 103/10 | (2006.01) | |
| C02F 1/24 | (2006.01) | |
| C02F 1/38 | (2006.01) | |
| C02F 103/36 | (2006.01) | |

(52) U.S. Cl.
CPC .................... *C02F 1/24* (2013.01); *C02F 1/38* (2013.01); *C02F 2101/10* (2013.01); *C02F 2101/101* (2013.01); *C02F 2103/10* (2013.01); *C02F 2103/365* (2013.01); *C02F 2303/22* (2013.01)

(56) References Cited

U.S. PATENT DOCUMENTS

| | | | |
|---|---|---|---|
| 7,727,404 | B2 | 6/2010 | Ylikangas et al. |
| 8,058,374 | B2 | 11/2011 | Rodrigues et al. |
| 8,636,069 | B2 | 1/2014 | Reddy et al. |
| 2003/0062315 | A1 | 4/2003 | Cornelius et al. |
| 2006/0162928 | A1 | 7/2006 | Collins et al. |
| 2007/0205157 | A1 | 9/2007 | Jones et al. |
| 2007/0235391 | A1 | 10/2007 | Ylikangas et al. |
| 2011/0036438 | A1 | 2/2011 | Jaromin et al. |
| 2011/0220358 | A1 | 9/2011 | Robinson et al. |
| 2013/0233796 | A1 | 9/2013 | Rao et al. |
| 2014/0008305 | A1 | 1/2014 | Nichols et al. |
| 2014/0260468 | A1 | 9/2014 | Bezbaruah et al. |
| 2015/0129477 | A1 | 5/2015 | Jones |

FOREIGN PATENT DOCUMENTS

| | | |
|---|---|---|
| WO | 2011036438 | 3/2011 |
| WO | 2016126546 A1 | 8/2016 |

OTHER PUBLICATIONS

Written Opinion of the International Searching Authority, dated Apr. 6, 2016, during the prosecution of International Application No. PCT/US2016/015657.

Dugstad, Arne, et al.; "Flow Assurance pH Stabilized Wet Gas Pipelines"; Corrosion 2003, Paper No. 03314, pp. 1-19.

FMC BioPolymer, The Science of Formulation Brochure; "A World of Possibilities Lies Just Below the Surface"; Alginates, 2003, Title pages, pp. 1-14, and photo pages.

Foss, M., et al.; "Interaction Between Scale Inhibitors and $FeCO_3$ Precipitation on Carbon Steel"; SPE 100510, May 2006, pp. 1-7.

Halvorsen, Anne, et al.; "pH Stabilisation for Internal Corrosion Protection of Pipeline Carrying Wet Gas with CO2 and Acetic Acid"; Corrosion 2003, Paper No. 03329, DD. 1-12.

Kashima, Keita, et al.; "Advanced Membrane Material from Marine Biological Polymer and Sensitive Molecular-Size Recognition for Promising Separation Technology"; Chapter 1, pp. 3-36, InTech 2012.

Australian Examination Report AU Patent Application No. 2016215637, dated May 15, 2020.

COMPOSITIONS AND METHODS FOR SCALE INHIBITION

CROSS REFERENCES TO RELATED APPLICATIONS

This application is a continuation of application Ser. No. 15/010,550, filed Jan. 29, 2016, which claims benefit under 35 USC 119 of U.S. Provisional Patent Application No. 62/111,312 with a filing date of Feb. 3, 2015, which is incorporated herein by reference in its entirety.

TECHNICAL FIELD

The present disclosure relates to compositions and methods to inhibit scale formation, deposition, and adherence in equipment and facilities in oil & gas operations.

BACKGROUND OF THE INVENTION

When an oil or gas well produces water (generally with a large content of dissolved salts), there is a possibility for scale to form. This may also occur in facilities where water injection is used as an improved recovery system, or when using gas with high $CO_2$ content and other components. Buildup of mineral deposits or incrustations may occur in pipes and equipment both on the surface and in the bottom of the well, or even inside the porous medium in the formation of the oil deposit itself. Buildup of scale deposits can result in significant reduction in oil production or even full blockages in pipes, and exacerbate corrosion on the surfaces of equipment used to handle and process such produced fluid.

As an example, oil and gas pipelines, including subsea pipelines, typically carry production fluids from the production wells (including subsea wells). The presence of calcium in the produced water from hydrocarbon extraction can result in the formation of inorganic and organic salts (known as scales) that may impede production of hydrocarbons or limit the ability to manage water in surface facilities and subsurface injection facilities. Ongoing deposition of scale in pipelines and equipment can result in production and injection impairment, flow restrictions, process upsets, and operational issues (e.g. malfunction of valves).

One common method for scale control is the injection of scale inhibitor chemicals. Scale inhibitors prevent the formation of large deposits of mineral scale that would otherwise form rapidly when the brine is oversaturated with respect to a specific scale type. The use of scale inhibitor chemicals for calcium scale control is most common in brines with low to moderate pH of ~4-7.

The application of scale inhibitor treatment is varied according to the location. Despite the widespread use of scale inhibitors, there are a number of operating conditions where the use of conventional scale inhibitors may not be viable and alternative strategies are required.

There is a need for improved compositions and methods to inhibit scale formation, deposition, and adherence thereof.

SUMMARY

A method for preventing scale formation is disclosed.

In one aspect, the invention relates to a method of inhibiting the formation of scale on equipment in contact with a produced fluid containing at least a scale-forming divalent cation. The method comprises: adding an alginate in an amount effective for the alginate to cross-link with the divalent cation in the produced fluid; separating the cross-linked alginate gel in the produced fluid; removing the cross-linked alginate gel from the produced fluid; and redissolving the cross-linked gel thus returning it to a reusable form.

In another aspect, the invention relates to a method of inhibiting calcium scale formation on equipment in contact with a produced fluid. The method comprises: determining the calcium scale forming profile of the produced fluid, including concentration and characteristics of calcium ions in the produced fluid; selecting an alginate having a pre-select M/G ratio to cross-link with the calcium ions in the produced fluid; adding the alginate having a pre-select M/G ratio in an amount effective for the alginate to cross-link with the calcium ions in the produced fluid to form cross-linked calcium alginate gel; separating the cross-linked calcium alginate gel in the produced fluid; removing the cross-linked calcium alginate gel from the produced fluid; and redissolving the cross-linked calcium alginate gel thus returning it to a reusable form.

DETAILED DESCRIPTION

Figure 1:
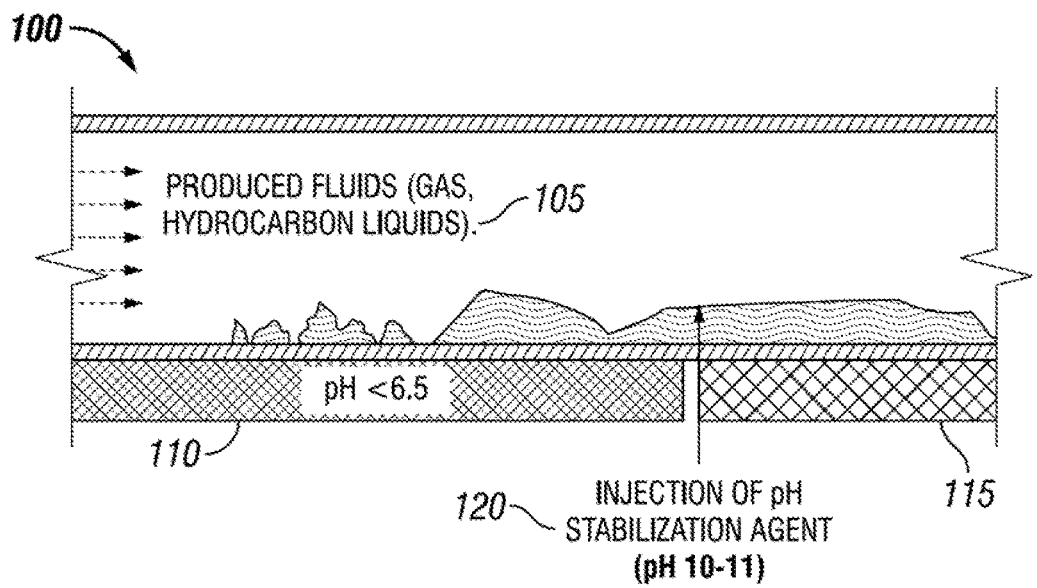
FIG. 1 is a diagram illustrating scale control in a base design case, for a pH stabilized pipeline that does not carry formation water where pH stabilization is used to control the corrosion rate of the pipeline.

The following terms will be used throughout the specification and will have the following meanings unless otherwise indicated.

"Comprise", "have", "include" and "contain" (and their variants) are open-ended linking verbs and allow the addition of other elements when used in a claim.

"Effective amount," refers to an amount sufficient to effect a measurable difference over not including the amount.

"Scale," "calcium scale" and "calcium salt scale" as used in the specification and claims herein shall include without limitation all scale consisting of insoluble salts formed from divalent cations in the processes described herein, e.g., calcium, magnesium, barium, strontium, etc.

"Scaling" relates to the formation of "scale" as defined above.

"Inhibitor" or "inhibition" as used herein means that scale formation quantity is reduced or the character of the scale formation is changed, e.g., the adherent nature of the scale is reduced, or the scale becomes semi-solid or as a gel.

"Produced fluids" may be used interchangeably with produced waters, referring to mixtures of hydrocarbons and water that is typically extracted with the hydrocarbons from a formation. As used herein, produced fluids also include fracture fluids, which can be recycled produced water or water from co-located wells for use in creating fractures in shale formation (sometimes can be referred to as "brine"). Produced fluids may also contain glycols that have been injected into the well fluids to prevent hydrate formation. Produced fluids may include formation water (e.g., connate water), produced water, hydrocarbon liquids, gas, or any combination thereof. Also, sometimes the terminology "produced fluids" and "produced fluid" is used interchangeably herein.

The presence of divalent cations such as calcium and magnesium in produced fluids can result in the formation of inorganic and organic salts (known as scales) that may impede production/extraction of hydrocarbons, or limit the ability to manage water in surface facilities and subsurface injection facilities. Disclosed is a method and a composition to inhibit scale formation, deposition, and adherence thereof in equipment, facilities, and operations for the exploration, production, and processing of hydrocarbons.

Types of Scale Formation:

The scale formation to be inhibited can be inorganic, organic, and/or mixtures thereof. Inorganic scales can deposit throughout the entire production and processing system used for oil & gas production. The most common type of inorganic scale formed in oil and gas operations is calcium carbonate. The driving forces for calcium carbonate deposition are primarily increases in pH and increases in temperature, as in the prior art, the use of scale inhibitor chemicals for calcium scale control is most common in low to moderate pH environments.

Organic scales such as calcium carboxylate or naphthenate salts are less common than inorganic scales, but can cause severe processing and maintenance issues in surface facilities. The formation of these salts can occur during the production of hydrocarbons that contain naphthenic type acids in conjunction with produced waters that contain calcium. During the production and processing of these fluids, the reduction in pressure causes the pH of the brine to increase as a result of the dissolution of acidic gasses, thus allowing the naphthenic acid species to form salts with the calcium ions.

Scale Inhibition Composition:

The composition for use in inhibiting the formation of scales is an alginate composition with an affinity for divalent cations (e.g., calcium) and the ion-complexing properties of the alginates, thus obviating the formation of the solid inorganic and or organic scales. Alginates have been primarily used in the biomedical industry, e.g., creating a moist healing environment for the management of chronic wounds; or used as a stabilizer, thickener, and emulsifier in the food industry; or for use in biomedical applications as a diet-aid supplement. The unique complexing and gel forming properties of alginates can be conveniently used to inhibit the formation and adherence of solid scales for oil & gas applications.

Alginates provide the main structural component of brown algae (seaweeds). Alginates are linear copolymers of (1-4) linked β-d-mannuronic acid (M) and α-1-guluronic acid (G). The distribution of M and G in alginate chains gives rise to three different block types, namely blocks of poly-M, blocks of poly-G and alternating MG blocks. The characteristics of alginate can be dictated by the content of the G blocks, and also their length. Alginate's ability to form gels arises from divalent cations or other multivalent ions fitting into the G-block structure, binding the alginate monomers together to form a continuous network.

The chemical composition of alginate is variable according to the seaweed species, within different parts of the same plant (stem or leaf), seasonal changes and the conditions of the sea. Alginates molecular arrangement and composition are determined primarily by the source from which they are obtained. For example, an alginate derived from Macrocystis pyrifera has an M/G ratio of ~1.56:1; and an alginate derived from *Laminaria Hyperborea* has an M/G ratio equal to 0.45. The common, commercially available alginates have a G content of approximately 40%. A high content of G-blocks gives an alginate of high affinity and selectivity for polyvalent cations.

The affinity for cations and the gel forming properties of the alginates, i.e., producing a cross-linked structure with cations, are mostly related to the content of G residues, as when two G residues are adjacent in the polymer they form a binding site for polyvalent cations. The gel-forming involves the binding or chelating of the scale-forming ions such as magnesium, barium, calcium, etc., inside the structure of two guluronic acid (G blocks) of the alginate structure.

A gel, in classical colloid terminology, is a system which owes its characteristic properties to a cross-linked network of polymer chains which form at the gel point. The alginate gels formed consist of highly hydrated alginate polymers. By proper selection of the alginate gelling agent, gel structure and rigidity can be controlled. Soft gels tend to flow and assume the shape of their container. Alginates from *Laminaria hyperborea* seaweed with a large percentage of the G-blocks, form rigid, brittle gels which tend to undergo syneresis, or loss of bound water. In contrast, alginate from Macrocystis pyrifera or Ascophyllum nodosum forms elastic gels which can be deformed with a reduced tendency toward syneresis.

In one embodiment, an alginate composition has a preselected M/G ratio suitable for the environment where the alginate is injected and optimum for the resultant physical properties of the 1 cross-linked structure (i.e., the resulting gel) such as gel strength, shear thinning and viscosity. Factors affecting the gel properties include the composition, pH and temperature of the produced fluids as well as the concentration and type of scale forming materials (e.g., calcium or magnesium ions, inorganic or organic scale forming materials).

In one embodiment, the alginate has a ratio of mannuronic acid to guluronic acid (M/G) of any of less than 1; less than 0.7; and 0.5. In another embodiment for use with produced fluids having a low pH, the alginate has a larger amount of guluronic acid compared to mannuronic acid, e.g., where guluronic acid is above 60% and the amount of mannuronic acid is below 40% of the total content of alginate. In yet another embodiment, the ratio of beta-D mannuronic acid to alpha-L guluronic acid in the high viscosity alginates is equal to or above 1. In one embodiment, wherein it is desirable for the cross-linked gels (or flocs) to be sufficiently strong to be separated from the produced fluids by mechanical methods such as cyclone separation, the alginate has a G-content above any of 30%; 40%; and 50%. In one embodiment wherein most of the scale formation is expected from barium or strontium ions, the alginate employed has an M/G ratio ranging from 0.01 to 0.8.

In yet another embodiment, the alginate has a G-content of more than or equal to 50% (e.g., at least 50%). For example, a G-content of more than or equal to 50% (e.g., at least 50%) may be used where scale formation is expected to be from calcium. In yet another embodiment, the alginate has a G-content of more than or equal to 60% (e.g., at least 60%). In yet another embodiment, the alginate has a G-content of more than or equal to 70% (e.g., at least 70%). In yet another embodiment, the alginate has a G-content of 50% to 80%. In yet another embodiment, the alginate has a G-content of 50% to 70%. In yet another embodiment, the alginate has a G-content of 50% to 60%. In yet another embodiment, the alginate has a G-content of 50% to 55%. In yet another embodiment, the alginate has a G-content of 55% to 60%. In yet another embodiment, the alginate has a G-content of 60% to 80%. In yet another embodiment, the alginate has a G-content of 60% to 70%. In yet another embodiment, the alginate has a G-content of 60% to 65%. In yet another embodiment, the alginate has a G-content of 65% to 75%. In yet another embodiment, the alginate has a G-content of 55% to 70%.

In one embodiment, the alginate has a M/G ratio to cross-link with the divalent cation, and wherein the G-content of the alginate is at least (or is a minimum of) 50% which is equivalent to the M/G ratio of the alginate being a maximum of 1.

A G-content in alginate of 50% may be considered to be a 1:1 ratio. In one embodiment, the alginate has a maximum M/G ratio of 1:1.

In one embodiment for the prevention of calcium forming scale, the alginate has a weight ratio of M/G block ranging from 0.33:1 to 1:1. In another embodiment, the alginate has a weight ratio of M/G block from 0.45:1 to 1:1. In another embodiment, the alginate has a weight ratio of M/G block from 0.33:1 to 0.75:1. In another embodiment, the alginate has a weight ratio of M/G block from 0.45:1 to 0.75:1. In another embodiment, the alginate has a weight ratio of M/G block from 0.5:1 to 0.75:1. In another embodiment, the alginate has a weight ratio of M/G block from 0.6:1 to 0.75:1. In another embodiment, the alginate has a weight ratio of M/G block from 0.70:1 to 0.75:1.

In another embodiment, the alginate is added to the produced fluid as a solution of 0.3 to 5% alginate (e.g., as sodium alginate), and at a ratio of sodium ions to calcium ions at a ratio ranging from 10:1 to about 50:1. In yet another embodiment, the alginate is added as a solution of less than or equal to 3% alginate (e.g., as sodium alginate). In another embodiment, the alginate is added as a solution of less than or equal to 2% alginate (e.g., as sodium alginate). In another embodiment, the alginate is added as a solution of less than or equal to 1% alginate (e.g., as sodium alginate). The upper limit can be determined by the physical characteristics of the alginate which can start to become increasingly viscous and insoluble.

In one embodiment, the alginate composition is a mixture of different alginates with different M/G ratios and/or different viscosities to provide the desired effects, e.g., the composition will be readily soluble in water, such that the composition can be easily used to prepare an aqueous preparation without substantive mixing. The alginate composition can be in the form of a solution or a water soluble monovalent salt of alginate (e.g., Na salt, K salt, or $NH_4$ salt), slurried and/or dissolved in a carrier fluid e.g., water, mono ethylene glycol (MEG), etc., in a sufficient amount for the alginate to effectively cross-link with the scale-forming cations in the produced fluid. A sufficient amount means an amount for the alginate to effectively cross-link with at greater than 75% cross-linking in one embodiment; at least 90% cross-linking in a second embodiment; at least 95% cross-linking in a third embodiment; and at least 99% cross-linking in a fourth embodiment.

In one embodiment, alginate can be used to inhibit scale when the quantity of divalent cations in the produced fluid is between about zero divalent cations (e.g., less than 10 ppm) and saturated produced fluid of divalent cations (e.g., calcium ions). For example, an upper limit may be determined by the saturation point for the cations (e.g., calcium ions) which is dependent on fluid composition and conditions.

As most if not all of the scale forming materials in the produced fluids, e.g., the calcium ions, the magnesium ions, the barium ions, etc., react with the alginate to form gels instead of hard-scale on pipes and equipment, the occurrence of scale on equipment is significantly reduced if not prevented. Scale formation is reduced at least 75% compared to an occurrence without any alginate treatment/addition in one embodiment; at least 90% reduction in a second embodiment; at least 95% reduction in a third embodiment; and at least 99% reduction in a fourth embodiment.

Optional Additives: In one embodiment, an optional amount of additives, e.g., a preservative such as benzoic acid, potassium sorbate, sodium benzoate is added to the alginate composition to prevent the microbial growth. In yet another embodiment, a sufficient amount of a base is added to the alginate composition/carrier fluid (e.g., MEG) to adjust the pH for a desired cross-linked structure with suitable rheological properties for transport through the pipelines.

Methods for Inhibiting Scale Formation: In one embodiment, the amount and type of alginates to be injected for scale inhibition can be determined from a reference database. The reference database is used to characterize the scale inhibition characteristics of a selected alginate, as well the optimization and blending of alginate compositions for optimal scale inhibiting results. The reference database can contain correlations of any of the alginate properties, e.g., ratio of the M&G blocks of alginates, viscosity, and solubility with; a) properties of produced fluids including but not limited to the uptake of divalent cations, gel strength, viscosity, the amount of monovalent salts in the produced fluid; and b) properties of cross-linked gel products.

In one embodiment, the divalent cation scale forming profile in the produced fluid is first determined, along with the characteristics of the produced fluid, e.g., pH, operating temperature, components, iron level, etc. In the next step based on the correlations, an alginate with a particular M/G ratio is selected to enhance the functionality of the alginate to minimize the crystal growth of the scale by maximizing the uptake of scale-forming divalent cations, e.g., $Ca^{++}$, from the produced water into a calcium-alginate cross-linked structure, i.e., gels, with suitable rheological properties for transport through pipeline infrastructure or for subsequent prevention using methods known in the art.

In one embodiment for the prevention/control of scale formation in a pipeline, the alginate can be introduced into the pipeline by itself, or with a carrier fluid such as MEG, into the production well at the well head, into a manifold, into a location downhole in the wellbore, at an intermediate location of the pipeline between the production well and a processing facility (e.g., brine treatment facility, glycol treatment facility or glycol processing plant, etc.), at intervals along the pipeline, or any combination of the above.

The cross-linked gels/agglomerates/complexes may be removed downstream and the alginate recovered for reuse by any combination of mechanical and chemical means known in the art, e.g., by settling, sieving, using a centrifuge or cyclone, pH adjustment and elution.

Scale Inhibiting Applications:

The inventive method to use alginates for scale inhibition and control can be particularly advantageous for conditions where the use of common scale inhibitors may not be viable. These scenarios include but are not limited to: a) operations with high pH, high saturation ratio or high temperatures or in areas where the brine is re-used or re-injected; b) systems where corrosion is managed by a 'pH stabilization' method; c) operations and processes for the preparation, storage and use of fracture fluids; d) glycol distillation system for the pre-treatment of produced fluids; e) operations wherein the scale comprises calcium naphthenate/carboxylate salts, solids and emulsions; and processes involving high iron, oxygenated systems; f) sour water stripping system; g) systems with high contents of both Ca and $SO_4$ to result in high scaling risk of $CaSO_4$ based minerals; h) operations where the produced fluid includes sulfur; i) operations where the produced fluid includes sulfates; j) other operation; k) any combination thereof; l) etc.

Scale Inhibition in Gas Production Pipelines Employing pH Stabilization:

pH stabilization can be used as a method to control $CO_2$ corrosion in gas production pipelines. In this technique, a high pH base (e.g., NaOH, MDEA, KOH, etc.) is used to promote the formation of iron carbonate scale as a passivating film to protect the internal pipe wall from on-going corrosion. A prerequisite for pH stabilization method is that the pipeline does not carry formation water, since the presence of calcium ions from formation water may lead to a calcium carbonate formation in the elevated pH environment of the system. In the prior art with the use of scale inhibitors for pH stabilized systems, the kinetics of iron carbonate deposition can be affected with growth and resultant density of the iron carbonate passivating layer, which could compromise the ability of the pH stabilization method to control corrosion in the pipeline. The use of alginates as a scale inhibition/control method obviates the scale formation while allowing the formation of the iron carbonate passivating layer.

Preparation of Fracture Fluids:

Alginates can also be used for controlling/inhibiting scale formation in the preparation, storage and use of fracture fluids. In a typical hydraulic fracturing operation, there is a need to use recycled produced water or alternatively, co-located water source wells to supply brine for the preparation of fracture fluids. This often leads to the use of waters that contain divalent ions (e.g., calcium, magnesium, etc.) for preparation of the final fracture fluid. If levels of divalent cations in the brines are high enough, this can result in scale deposition occurring in equipment during the preparation of the fracturing fluid. Scale deposition would lead to equipment downtime and cleaning, and may necessitate the use of acids or other scale solvents to remove the deposits. If the scale were to deposit downhole during the use of the fracture fluid, this may reduce post-frac production from the well. In the prior art, water to be used as "brine" may be pre-treated or "softened" to remove divalent cations such as calcium prior to its use, with techniques such as lime softening and/or ion exchange to reduce the calcium level sufficiently to prevent inorganic scale precipitation. The use of alginates as a scale inhibition/control method obviates the water pre-treatment step.

Glycol Distillation Systems:

In the prior art method for preventing scaling of glycol distillation systems, prior to distillation of rich glycol (e.g., a mixture of produced water and glycol typically containing 40-70% MEG), large volumes of alkali chemicals (e.g., NaOH, KOH, $K_2CO_3$, etc.) are added to rich glycol in a heated pre-treatment system to forcibly precipitate and remove divalent salts. In one embodiment, alginate is used to remove calcium and other divalent ions from the rich glycol, thus obviating the need for the handling of large volumes of alkali chemicals and the requirement for heating the rich glycol prior to distillation.

Systems with Organic Scales & Emulsions.

During the production and processing of hydrocarbons that contain naphthenic type acids in conjunction with produced waters that contain divalent cations such as $Ca^{2+}$ or $Mg^{2+}$, the reduction in pressure can cause an increase in the pH of the brine, allowing the naphthenic acid species to form salts with the divalent cations. The presence of naphthenate salts result in emulsions and solid deposition. Commercially available scale inhibitors are not effective on these types of organic salts; hence the scale formation is typically controlled by process optimization or by the use of large volumes of acid to suppress the pH. The use of alginates to control/inhibit the organic scale formation obviates the need for process optimization in the prior art, which may include controlling the rate of depressurization of the fluids, injection of demulsifiers, and/or injection of organic or mineral acids into the produced fluid stream to maintain the pH to prevent calcium naphthenate formation.

High Iron/Oxygenated Systems:

Many common scale inhibitor products are ineffective when $Fe^{2+}$ levels exceed 50-100 ppm in produced fluids. In addition, $Fe^{3+}$ will also render common scale inhibitors ineffective if present in the produced fluids at levels >1 ppm. The use of alginates facilitates the control/inhibition of scale formation in high iron, oxygenated systems, obviating the need for remedial treatment such as pipeline removal or chemical cleaning to remove scale formation.

Sour Water Stripping Systems:

Sour water stripping is widely used to remove sulfides from produced water so that it can be safely and reliably disposed of, re-injected, or re-used after proper treatment. The sour water is sent through a stripping tower where a gas (usually steam) stream is applied to force $H_2S$ and in the meanwhile, $CO_2$, out of the water phase. By removing these acidic components from the produced water, the process usually results in increased pH, and consequently leads to a higher scaling risk of $CaCO_3$. In some scenarios seen in the field, the Ca concentration in the produced water is so high that commercial inhibitors, such as NTMP, would be ineffective. Ca removal through pre-precipitation (softening) or pH adjustment of the produced water is usually recommended to control such scaling risk in the prior art. The use of alginates reduce the availability of Ca to form CaCO3 precipitation, and could thus obviate the needs for these pretreatment processes.

High Ca/$SO_4$ systems: Although $CaSO_4$ scaling is not as common as $BaSO_4$ and $CaCO_3$ due to its relatively high solubility, it has been seen in the field that systems with high concentrations of both Ca and $SO_4$ can have significant scaling risk of $CaSO_4$ based minerals (e.g., gypsum, hemihydrite, anhydrite, etc.) that are difficult to inhibit due to the large amounts of potential precipitation. If pH is lowered in the same system to control the scaling of carbonates/sulfides, the availability of Ca is further increased to induce more $CaSO_4$ scale, which is not sensitive to change in pH. Ca reduction might be the only viable option in these systems. Although processes such as softening precipitation or membrane filtration can be utilized to pre-treat the water, alginates could be dosed in the same water to chelate Ca and obviate these pretreatment needs.

Figures Illustrating Embodiments

Reference will be made to the figures to further illustrate embodiments of the invention. Of note, in FIGS. 1-4, the produced fluids may comprise gas and hydrocarbon liquids, produced water (e.g., brine), and formation water (e.g., connate water). The different terminology is used for simplicity, but the scope of the claims should not be limited by the use of the different terminology in the embodiments of this disclosure.

FIG. 1 is a diagram illustrating an embodiment 100 of a base design case of a pH stabilized pipeline for the transport of produced fluids without any formation water. In this operation, a pH stabilizing agent (e.g., MDEA, KOH, $NaHCO_3$, etc.) is added to the produced fluids 105 (e.g., gas, hydrocarbon liquids) at 120 to raise the pH of <6.5 in section 110 to a pH of >6.5 in section 115, with the formation of iron carbonate passivating scale to provide corrosion protection for the pipeline.

Figure 2:
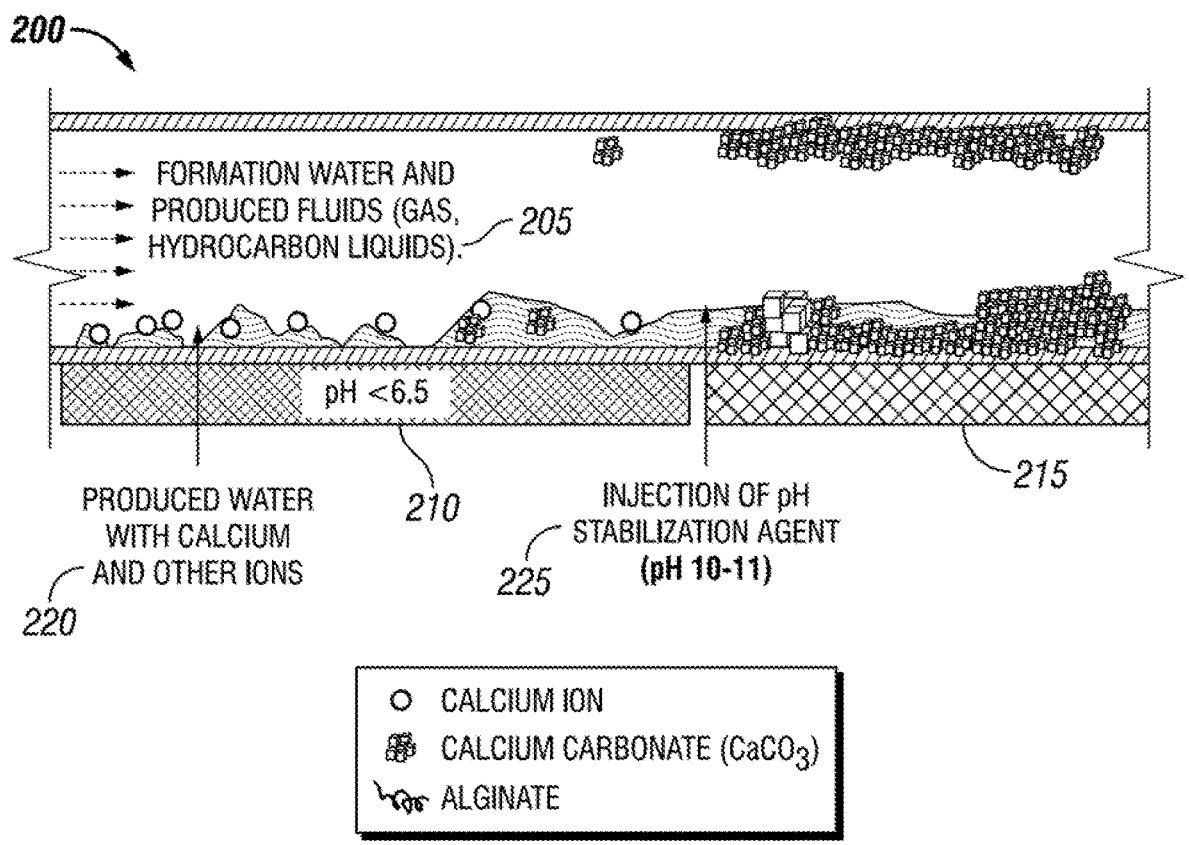
FIG. 2 is a diagram illustrating scale deposition in a pH stabilized pipeline carrying formation water.

In FIG. 2 for the same operation, an embodiment 200 includes produced fluids 205 that comprise formation water (e.g., connate water) containing calcium and other ions at 220. There is moderate to low level of $CaCO_3$ scale forming/ deposition due to unmitigated calcium in the produced fluids in the section 210 with pH<6.5. As illustrated, after the injection of pH stabilizing agent at 225, a very high quantity of $CaCO_3$ deposit/scale is observed due to unmitigated calcium in the produced fluids under the high pH of >6.5 in section 215.

Figure 3:
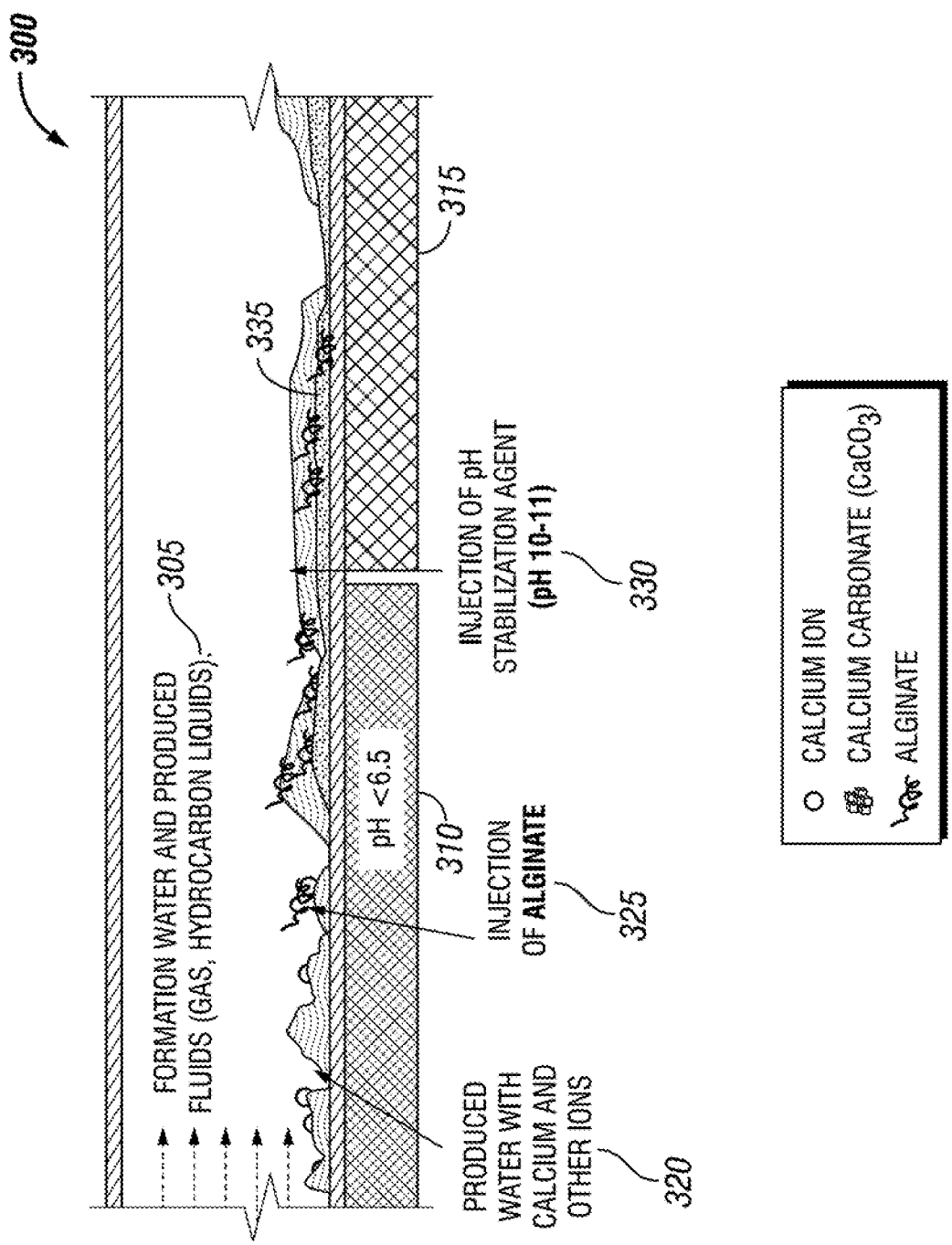
FIG. 3 is a diagram illustrating an embodiment for scale control with alginate in a pH stabilized pipeline carrying formation water.

FIG. 3 illustrates an embodiment 300 of the invention for the inhibition of scale formation/adherence in the operation of FIG. 2. As in FIG. 2, the embodiment 300 includes produced fluids 305 that comprise formation water containing calcium and other ions at 320, a section 310 with pH<6.5, and a section 315 of pH >6.5 after the injection of pH stabilizing agent at 330. With the injection of alginate at 325, the alginate cross-links with calcium forming a gel 335/viscous phase containing calcium ions (which would otherwise have formed $CaCO_3$ deposit/scale).

Figure 4:
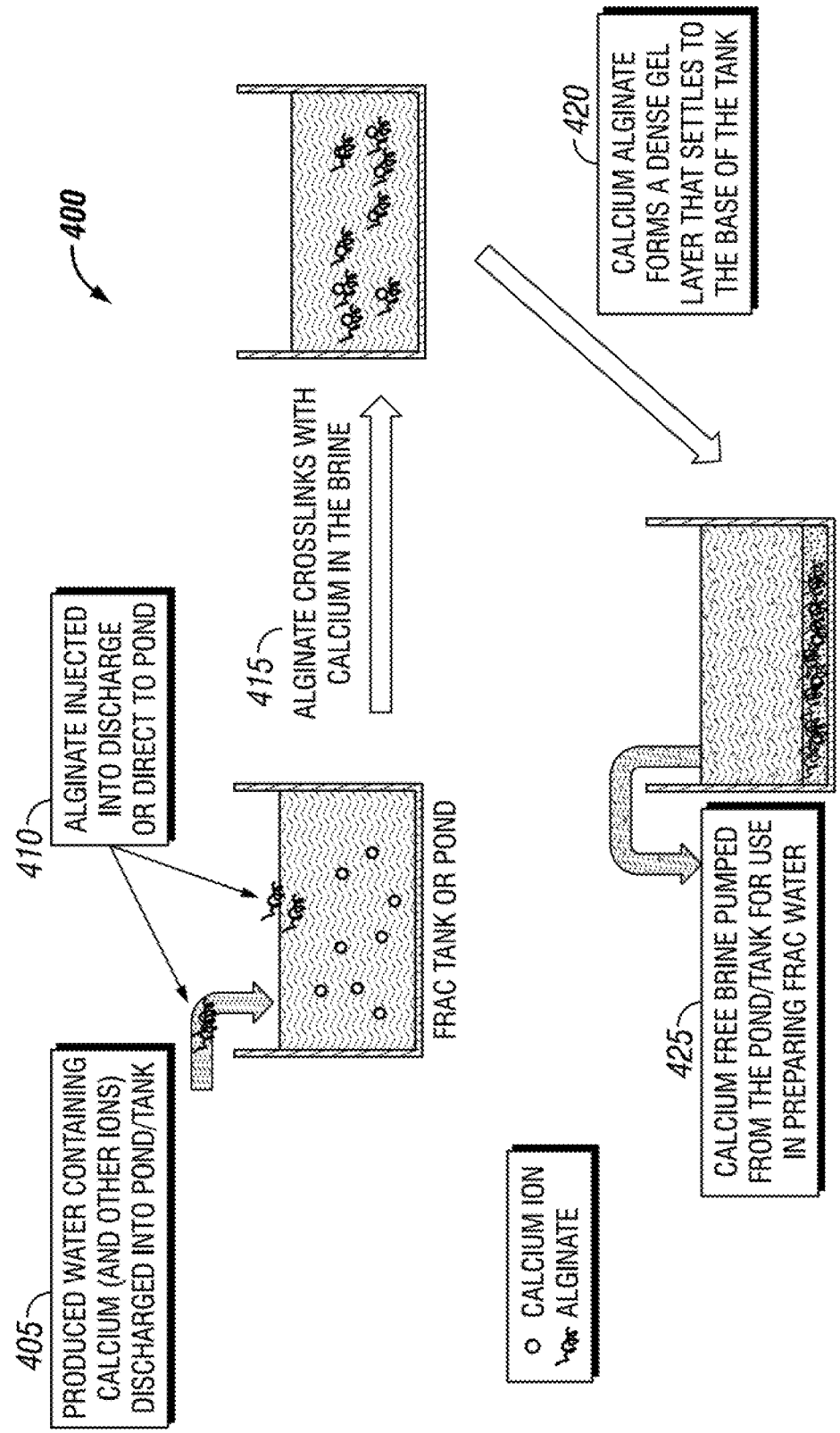
FIG. 4 is a diagram illustrating using alginate to mitigate scale formation in brine to be used for hydraulic fracturing applications.

FIG. 4 illustrates an embodiment for the use of alginate in brine treatment applications, e.g., the treatment of brine ("produced water") for use in fracturing applications. In one embodiment 400, brine containing calcium (and other ions) is discharged into a pond/tank at 405. At 410, alginate is injected into the inlet of a discharge pump along with the brine, or it can be discharged into the pond/tank where the brine is stored. The alginate cross-links with calcium in the brine at 415, forming a gel layer that settles at the bottom of the pond/tank at 420. The settling of the gel (e.g., cross-linked calcium alginate gel) in the brine is an example of separating the cross-linked alginate gel in the produced fluid. For example, the various components of the brine can separate by phases within the pond/tank, with the lightest components towards the top, and the heavier gel settles towards the base of the pond/tank. Thus, these components are splitting by phase. In some embodiments, separating the cross-linked alginate gel in the produced fluid can be phase separating the cross-linked alginate gel in the produced fluid.

At 425, calcium-free brine is removed/pumped from the pond/tank for use in preparing frac water. The frac water can be prepared by adding proppants and other components. Removing the calcium-free brine from the pond/tank and leaving behind the gel that has settled is one example of removing the gel from the produced fluid. In another embodiment, the gel is not left behind and can also be removed from the pond/tank. In yet another embodiment, the gel is removed first and the brine is left in the pond/tank. Nonetheless, the gel is removed from the calcium-free brine.

Figure 6:
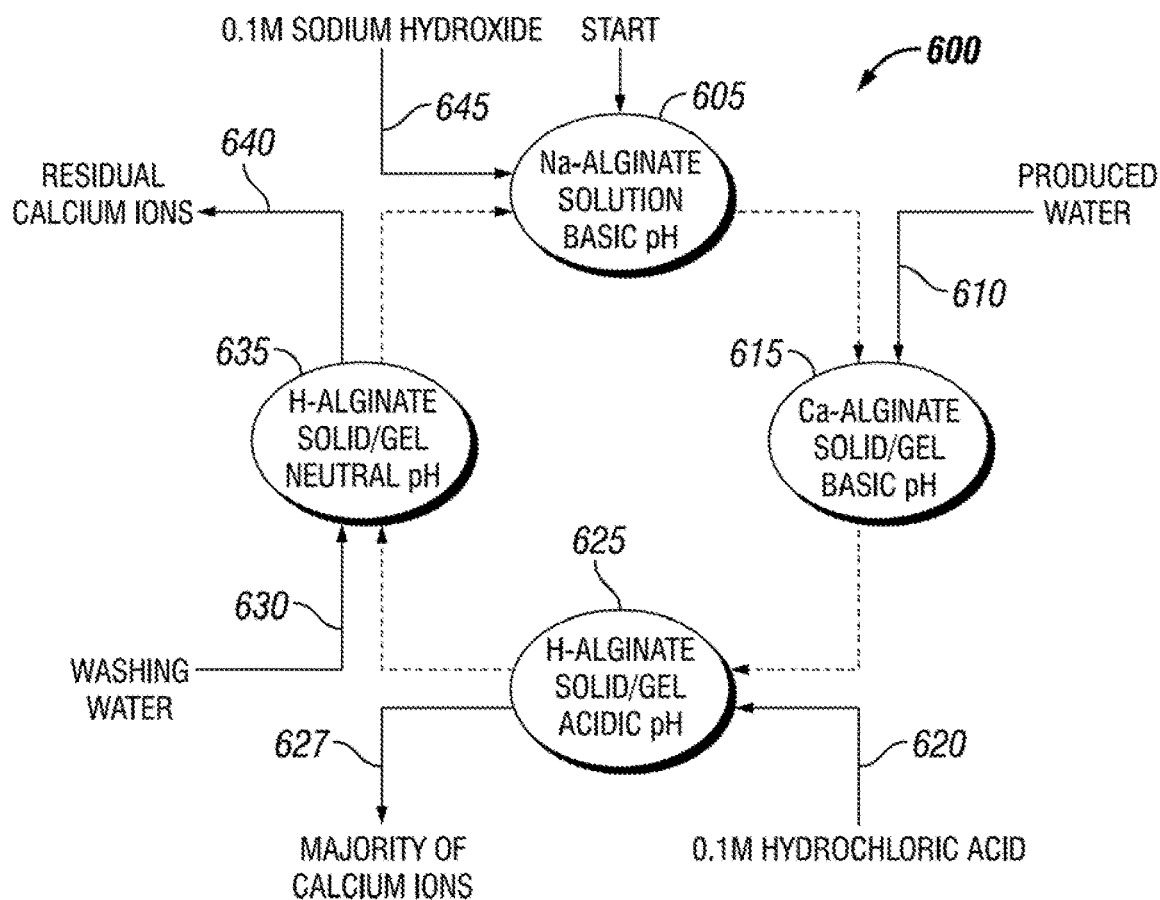
FIG. 6 is a diagram illustrating an embodiment of a process for the creation and resolution (e.g., redissolving) of the cross-linked gel, returning it to a reusable form.

Additionally, ions can be removed from the gel that has settled, and the gel can be redissolved, as explained further in FIG. 6. For example, the gel that has settled in FIG. 4 can be the gel at 615 of FIG. 6.

In an alternative embodiment, FIG. 4 can be modified to inhibit scale formation using alginate and also remove or reduce sulfur from the produced fluids. In this alternative embodiment, the produced water at 405 of FIG. 4 can include sulfur in any quantity (often referred to as sour water). The sulfur level can be measured via inductively coupled plasma (ICP). In this alternative embodiment, the pond/tank at 410 can be practically any pond or tank, and it does not need to be specific for fracturing. In this alternative embodiment, at 425, the calcium-free brine is pumped from the pond/tank and sent to a sulfur stripper for removal of the sulfur. The sulfur stripper can be practically any sulfur stripper used or known by those of ordinary skill in the art for the removal of sulfur. After the sulfur has been removed, for example, the calcium-free brine can be pumped for general use or disposal. In this alternative embodiment, the produced fluid requires treatment in a sulphur stripper, and the process used to remove sulphur can cause the scale to form. The scale formation can be inhibited by the addition of the alginate.

In an alternative embodiment, FIG. 4 can be modified to inhibit scale formation using alginate when the produced fluids include sulfate. In this alternative embodiment, the produced water at 405 of FIG. 4 can include sulfate, such as a high sulfate level. In one example, the sulfate level is more than or equal to 1500 mg/l. In another example, the sulfate level is more than or equal to 2000 mg/l. In another example, the sulfate level is in a range of 1500 mg/l to 2000 mg/l. The sulfate level can be measured via EPA Method 9038. Alternatively, the sulfate level can be measured using a sulfate test kit, such as a kit available from Hach Company, PO Box 389, Loveland, Colo. 80539. In this alternative embodiment, the sulfate level is not necessarily altered and the focus is removing Ca so that in the case of high SO4 (e.g., SO4>2, 000 mg/l or so), the alginate can prevent unwanted precipitation and deposition of CaSO4 scale. In this alternative embodiment, the pond/tank at 410 can be practically any pond or tank, and it does not need to be specific for fracturing. In this alternative embodiment, at 425, the calcium-free brine is pumped from the pond/tank for general use or disposal. Thus, this alternative embodiment reduces the risk of calcium sulfate.

Various other alternatives or modifications are also possible. For example, the separating and removal steps may be accomplished in other ways. In one example, separation of the gel from the fluids could be by settling in a pond/tank and then removal of the gel from the pond/tank, with the fluids remaining in the pond/tank or overflowing from the pond/tank (e.g., fluids overflowing into another container). In another example, a form of filtration or cyclonic separation can be used where the fluids and the gel undertake simultaneous separation and removal. In another example, removing the cross-linked gel from the produced fluid is more about removing the calcium/divalent cations from the system (e.g., as part of redissolving the gel thus the removing step and the redissolving step may be combined into one step). Depending on the embodiment, the separating step, removing step, and redissolving steps can be performed as three separate steps. Depending on the embodiment, some or all of the separating step, removing step, and redissolving step can be combined. Depending on the embodiment, at least one of the separating step, removing step, or redissolving step can be omitted. Also, as indicated above, the separating step can be a phase separating step in some embodiments. Those of ordinary skill in the art will appreciate that the inventive concepts are not limited to the examples provided herein.

Figure 5:
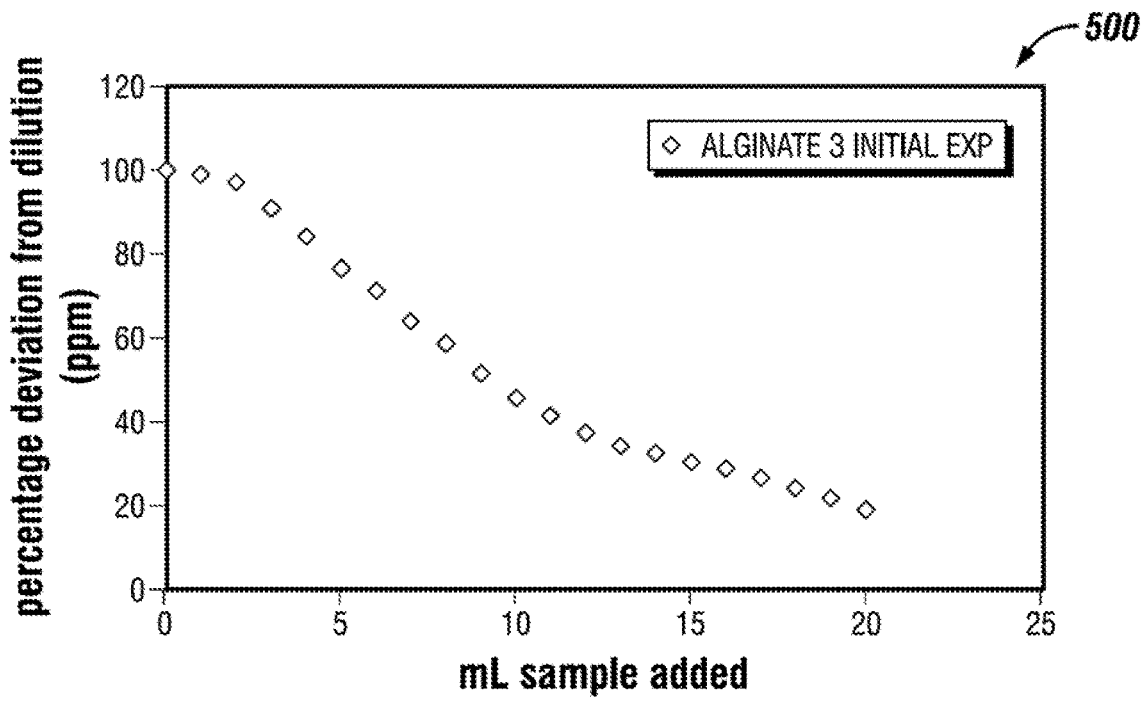
FIG. 5 is a diagram depicting the results of laboratory experiments demonstrating the effectiveness of alginate in reducing calcium ion concentration in one example.

FIG. 5 is a diagram depicting the results of laboratory experiments demonstrating the effectiveness of alginate in reducing calcium ion concentration in one example 500. In example 500, the addition of 15 ml of the 1% alginate solution can lead to a drop in calcium ion concentration of about 70% (from 100% to 30%) from the original 300 ppm solution, after allowing/normalising for the dilution effect of adding the alginate.

FIG. 6 is a diagram illustrating an embodiment of a process for the creation and resolution (e.g., redissolving or redissolution) of the cross-linked gel, returning it to a reusable form. A process 600 starts with creating an alginate solution at 605. As illustrated at 605, a sodium alginate solution can be created with a pH that is basic. At 610, the process 600 includes adding the sodium alginate solution to produced fluids, such as produced water, having divalent cations, such as calcium ions. At 615, the process 600 includes cross-linking between the alginate and the calcium ions to form a gel (e.g., a cross-linked calcium alginate gel) with a pH that is basic. The cross-linked calcium alginate gel is a solid or has a substantially solid consistency. The calcium ions would have formed deposit/scale without the alginate solution.

At 620, the process 600 includes adding an acid to the formed gel. For example, 0.1M hydrochloric acid can be added to the cross-linked calcium alginate gel to convert the calcium alginate into hydrogen alginate (alginic acid), resulting in a hydrogen alginate gel with a pH that is acidic. As illustrated at 627, the majority of calcium ions in the hydrogen alginate gel can be removed in process 600 as a result of the conversion of the calcium alginate into hydrogen alginate by the addition of acid. Of note, other acids or acid quantities can be used in other embodiments.

At 630, the process 600 includes adding washing fluid (e.g., washing water) to the hydrogen alginate gel to neutralize the pH. The washing water can be practically any type of water, fresh water, or fluid that can help neutralize the pH of the hydrogen alginate gel. A hydrogen alginate gel with a pH that is neutral is illustrated at 635. Furthermore, at 640, the addition of the washing water removes or washes away the residual calcium ions from the hydrogen alginate gel.

At 645, the process 600 includes adding a salt to the hydrogen alginate gel. For example, 0.1M sodium hydroxide can be added to the hydrogen alginate gel so that the alginate is redissolved in the form of the soluble salt, sodium alginate, that can be used to create the sodium alginate solution at 605.

As illustrated in FIG. 6, calcium ions are removed at two points in the process 600: (A) calcium ions are removed where the acid is added which converts the calcium alginate to hydrogen alginate (alginic acid) (620 to 627) and (B) calcium ion are removed again where the washing water removes or washes away the remaining the calcium ions (630 to 640). Furthermore, as mentioned above, by adding the sodium hydroxide, the alginate is redissolved in the form of the soluble salt, sodium alginate, that the process 600 starts with at 605. In some embodiments, redissolving the cross-linked gel thus returning it to a reusable form comprises one or more of: adding an acid to the cross-linked gel to change pH of the gel from basic to acidic; adding a washing fluid to the cross-linked gel to change the pH of the gel from acidic to neutral; and/or adding a salt to the cross-linked gel with the neutral pH to form an alginate. Therefore, at least one of these three steps can be part of redissolving. In some embodiments, at least one divalent ion is removed from the cross-linked gel in response to the addition of the acid, in response to the addition of the washing fluid, or both. The gel may be redissolved more effectively by removing calcium and/or divalent cations.

For the purposes of this specification and appended claims, unless otherwise indicated, all numbers expressing quantities, percentages or proportions, and other numerical values used in the specification and claims are to be understood as being modified in all instances by the term "about". Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a", "an", and "the", include plural references unless expressly and unequivocally limited to one referent.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

As used herein, terminology such as A, B, C, or any combination thereof (or the like such as A, B, C, or any mixtures thereof) relate to various options. In one embodiment, the terminology A, B, C, or any combination thereof means A only. In one embodiment, the terminology A, B, C, or any combination thereof means B only. In one embodiment, the terminology A, B, C, or any combination thereof means C only. In one embodiment, the terminology A, B, C, or any combination thereof means A and B only. In one embodiment, the terminology A, B, C, or any combination thereof means B and C only. In one embodiment, the terminology A, B, C, or any combination thereof means A and C only. In one embodiment, the terminology A, B, C, or any combination thereof means A, B, and C. Moreover, an embodiment can have a single A or a plurality of A. An embodiment can have a single B or a plurality of B. An embodiment can have a single C or a plurality of C.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference. It is to be expressly understood, however, that each of the figures is provided for the purpose of illustration and description only and is not intended as a definition of the limits of the present invention.

The invention claimed is:

1. A method of inhibiting formation of scale on equipment in contact with a produced fluid containing at least a scale-forming divalent cation, the method comprising:
adding an alginate in an amount effective for the alginate to cross-link with the divalent cation in the produced fluid to form cross-linked alginate gel;
separating the cross-linked alginate gel in the produced fluid;
removing the cross-linked alginate gel from the produced fluid; and
redissolving the cross-linked gel thus returning it to a reusable form.

2. The method of claim 1, wherein the produced fluid contains calcium carbonate, calcium carboxylate, calcium naphthenate, or any mixture thereof.

3. The method of claim 1, wherein the scale forming divalent cation is calcium and wherein alginate is added in an amount sufficient to convert at least 75% of calcium cations into a cross-linked calcium alginate gel.

4. The method of claim 1, wherein the equipment comprises a pipeline carrying produced fluid.

5. The method of claim 1, wherein the equipment comprises equipment in contact with the produced fluid in a brine or glycol treatment facility.

6. The method of claim 1, wherein the produced fluid is recycled produced water and wherein the cross-linked alginate gel is removed from the recycled produced water by floatation, sieving, a centrifuge, a cyclone, a gravity settling device, or any combination thereof.

7. The method of claim 1, wherein the produced fluid comprises sulfur, and wherein the method further comprises treating the produced water in a sulphur stripper.

8. The method of claim 7, further comprising removing the sulfur from the produced fluid after the cross-linked alginate gel has been removed from the produced fluid.

9. The method of claim 1, wherein the produced fluid comprises sulfate.

10. The method of claim 9, wherein the sulfate in the produced fluid is more than or equal to 1500 mg/l.

11. The method of claim 1, wherein the alginate is added to the produced fluid before a pH stabilization agent is added to the produced fluid.

12. The method of claim 1, wherein the alginate has a ratio of mannuronic acid (M) to guluronic acid (G) (an M/G ratio) to cross-link with the divalent cation, and wherein the G-content of the alginate is at least 50% by weight, which is equivalent to the M/G ratio of the alginate being a maximum of 1.

13. The method of claim 1, wherein the alginate is added to the produced fluid in a solution, and wherein the alginate is 0.3% to 5% by weight of the solution.

14. The method of claim 1, wherein redissolving the cross-linked gel thus returning it to a reusable form comprises at least one of:
adding an acid to the cross-linked gel to change pH of the gel from basic to acidic;
adding a washing fluid to the cross-linked gel to change the pH of the gel from acidic to neutral; or
adding a salt to the cross-linked gel with the neutral pH to form an alginate.

15. The method of claim 14, wherein at least one divalent ion is removed from the cross-linked gel in response to the addition of the acid, in response to the addition of the washing fluid, or both.

16. The method of claim 1, wherein the produced fluid is recycled or produced water for use in hydraulic fracturing operations.

17. The method of claim 1, wherein the alginate comprises a soluble alginate.

18. A method of inhibiting calcium scale formation on equipment in contact with a produced fluid, the method comprising:
determining the calcium scale forming profile of the produced fluid, including concentration and characteristics of calcium ions in the produced fluid;
selecting an alginate having a pre-select ratio of mannuronic acid (M) to guluronic acid (G) (a pre-select M/G ratio) to cross-link with the calcium ions in the produced fluid;
adding the alginate having the pre-select M/G ratio in an amount effective for the alginate to cross-link with the calcium ions in the produced fluid to form cross-linked calcium alginate gel;
separating the cross-linked calcium alginate gel in the produced fluid;
removing the cross-linked calcium alginate gel from the produced fluid; and
redissolving the cross-linked calcium alginate gel thus returning it to a reusable form.

19. The method of claim 18, wherein the G-content of the alginate is at least 50% by weight, which is equivalent to the M/G ratio of the alginate being a maximum of 1.

20. The method of claim 19, wherein the G-content of the alginate is 50% to 80% by weight.

21. The method of claim 18, wherein the M/G ratio is in a range of 0.33:1 to 1:1.

22. The method of claim 18, wherein redissolving the cross-linked calcium alginate gel thus returning it to a reusable form comprises at least one of:
adding an acid to the cross-linked calcium alginate gel to change pH of the gel from basic to acidic;
adding a washing fluid to the cross-linked calcium alginate gel to change the pH of the gel from acidic to neutral; or
adding a salt to the cross-linked calcium alginate gel with the neutral pH to form an alginate.

23. The method of claim 18, wherein the alginate comprises a soluble alginate.

* * * * *